United States Patent
Cheng (10) Patent No.: US 8,020,478 B2
(45) Date of Patent: Sep. 20, 2011

(54) WINDOW SHADE CUTTING APPARATUS

(76) Inventor: Li-Ming Cheng, Kaohsiung (TW)

( * ) Notice: Subject to any disclaimer, the term of this patent is extended or adjusted under 35 U.S.C. 154(b) by 557 days.

(21) Appl. No.: 12/250,639

(22) Filed: Oct. 14, 2008

(65) Prior Publication Data

US 2010/0089217 A1    Apr. 15, 2010

(51) Int. Cl.
*B26D 5/18*    (2006.01)
(52) U.S. Cl. ........... 83/630; 83/613; 83/631; 83/468; 83/452
(58) Field of Classification Search .......... 83/630, 83/631, 638, 374, 375, 378, 383, 604, 385, 83/391, 392, 437.1, 437.4–437.6, 451–453, 83/522.11, 522.13, 613, 616, 626, 694, 467.1, 83/468, 468.1, 468.2; 81/367; 72/315, 451
See application file for complete search history.

(56) References Cited

U.S. PATENT DOCUMENTS

| 173,587 | A | * | 2/1876 | Clarke ............................... 83/625 |
| 420,729 | A | * | 2/1890 | Moncharmont ................. 83/109 |
| 3,783,728 | A | * | 1/1974 | Glasman et al. ................. 83/620 |
| 4,630,516 | A | * | 12/1986 | Koch et al. ....................... 83/530 |
| 6,405,625 | B1 | * | 6/2002 | Nomura et al. .................. 83/618 |
| 6,435,066 | B1 | | 8/2002 | Kutchmarek et al. |
| 7,000,521 | B1 | | 2/2006 | Cheng et al. |

* cited by examiner

*Primary Examiner* — Phong H Nguyen
(74) *Attorney, Agent, or Firm* — Frenkel & Associates, PC (57) ABSTRACT

A window shade cutting apparatus includes a hollow frame which has a base, a front wall, a rear wall and a plurality of side walls to hold a shade guiding assembly, a cutter assembly located above the shade guiding assembly and coupled therewith, a clipping assembly located at one side of the base and a shade measuring assembly located at another side of the base. The cutter assembly has a transmission screw bar to drive a first toggle lever set and a second toggle lever set at two opposite sides to move a cutter vertically up and down to cut off a window shade easily with less effort.

24 Claims, 13 Drawing Sheets

WINDOW SHADE CUTTING APPARATUS

FIELD OF THE INVENTION

The present invention relates to a window shade cutting apparatus and particularly to an apparatus that has a frame within cutting assembly with a base to hold a window shade and a shade guiding assembly to confine the window shade to facilitate a cutter to move vertically downwards to instantly cut off the window shade with less effort.

BACKGROUND OF THE INVENTION

There are many different types of window shades on the market such as Venetian blinds, pleated window shades and the like. Some of them are installed by users after purchased. They have to measure first against the width of windows or doors to be installed, and the extra length of the shade has to be cut off if their width is greater than the width of the windows or doors.

Figure 1:
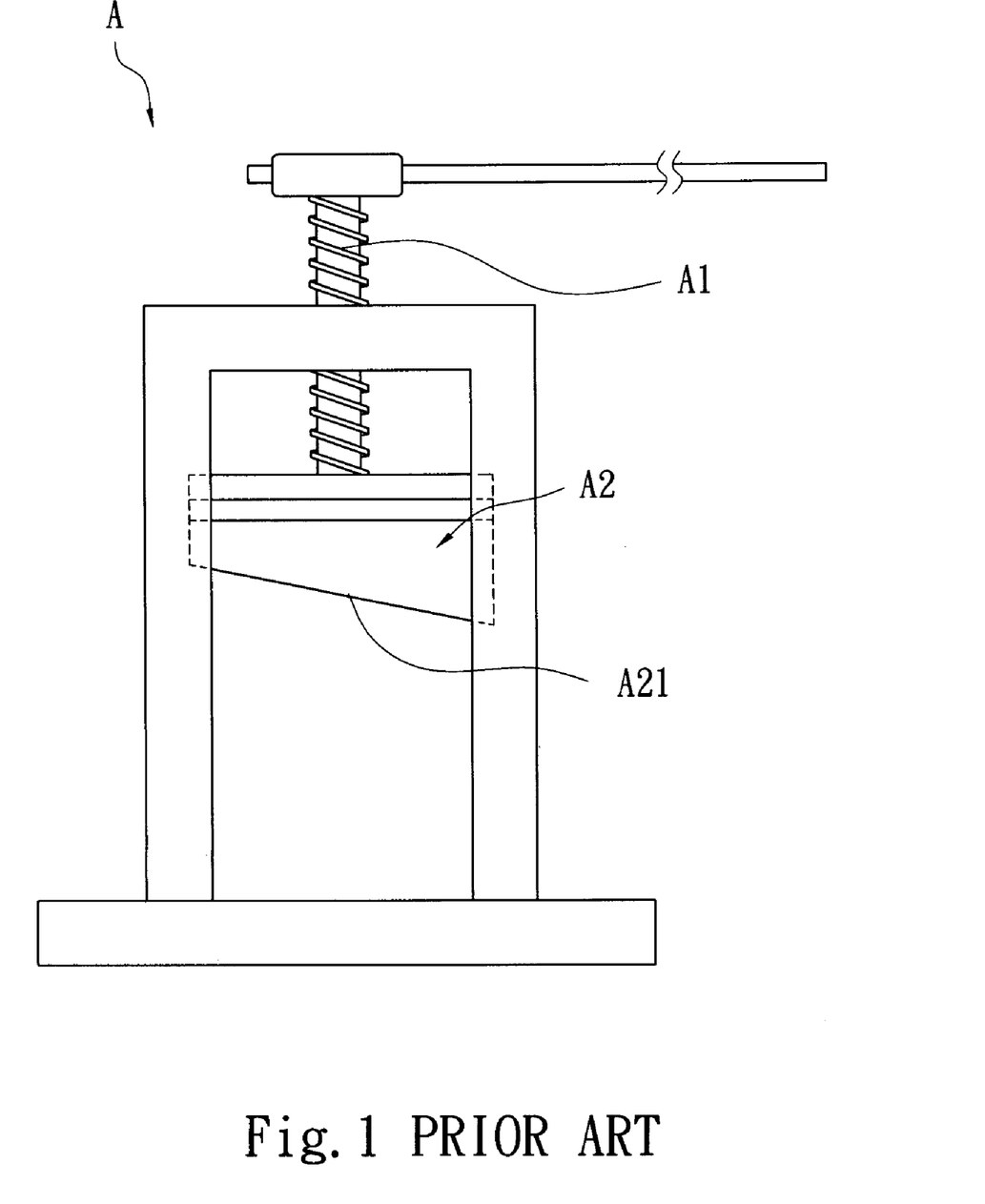
FIG. 1 is a schematic view of a conventional window shade cutting apparatus in a cutting condition.
Figure 2:
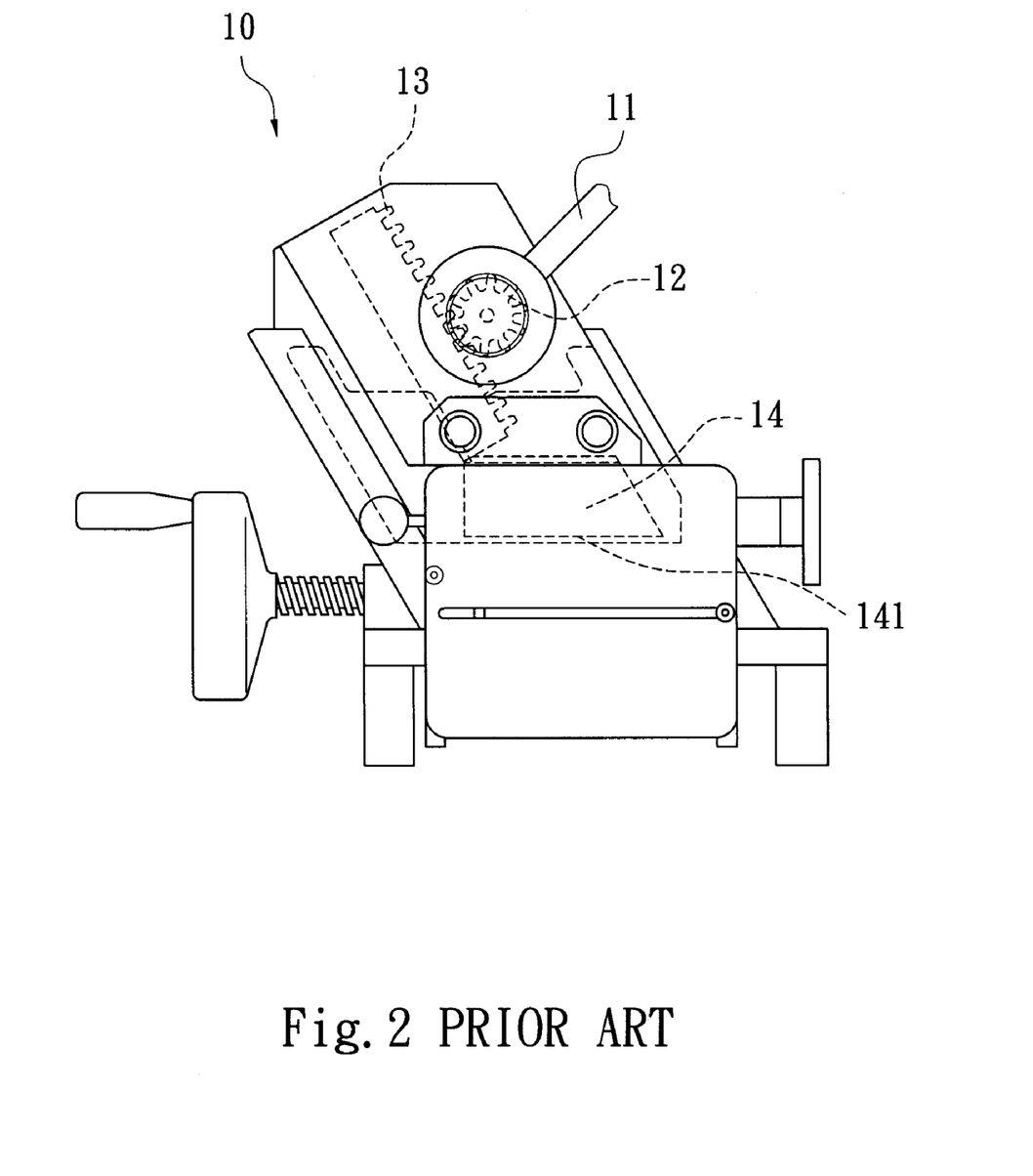
FIG. 2 is a schematic view of another conventional window shade cutting apparatus in a cutting condition.

U.S. Pat. No. 7,000,521 B1 discloses a pleated shade cutoff apparatus A as shown in FIG. 1. It mainly includes a screw bar A1 driving a blade A2 up and down so that the diagonal cutting edge A21 of the blade A2 can be moved up and down for a selected cutting distance. To accomplish cutting a huge force has to be applied on the screw bar A1. It takes a great effort and is not very practical. FIG. 2 illustrates another U.S. Pat. No. 6,435,066 B1 which is a cutting apparatus for window covering. The cutting apparatus 10 mainly includes an arm 11 pivotally coupled with a gear 12 to drive an engaged gear rack 13 so that a blade 14 also is driven to move a diagonal cutting edge 141 downwards to cut off a wound window shade. When in use a force is applied to the arm 11. To save cutting effort the arm 11 should be made at a greater length. As a result, a greater operation room is needed.

SUMMARY OF THE INVENTION

The present invention aims to provide a window shade cutting apparatus to solve the problems of the conventional techniques that adopt a screw bar or a gear/gear rack means to transmit a greater cutting force to sever a wound window shade. The cutting apparatus according to the invention has a frame and a base located thereon to hold a wound window shade, and a shade guiding assembly to confine the window shade to facilitate a cutter to move vertically downwards to instantly cut off the window shade with less effort.

To achieve the foregoing object the window shade cutting apparatus of the invention includes a frame consisting of a base, a front wall, a rear wall and a plurality of side walls to hold a shade guiding assembly, a cutter assembly located above the shade guiding assembly and coupled therewith, a located at one side of the base and a shade measuring assembly located at another side of the base that has a dimension scale. The cutter assembly has a transmission screw bar to drive a first toggle lever set and a second toggle lever set at two opposite sides to move a cutter vertically up and down.

The window shade cutting apparatus thus formed can achieve the following effects:

1. Cutting of the window shade can be done easier with less effort: The clipping assembly and shade measuring assembly at two sides of the base can hold and retain the window shade. The transmission screw bar of the cutter assembly can drive the first and second toggle lever sets at the two opposite sides to vertically move the cutting edge of the cutter close to a lower cutting surface of the shade guiding assembly so that the window shade can be cut off instantly with less effort.

2. Provide length measurement function: During cutting operation the cutoff portion of the window shade can be measured and marked through the shade measuring assembly. Therefore a desired length of the window shade can be obtained to fit the width of a window or door.

3. It is adoptable to various types of specifications: The shade measuring assembly can be adjusted to measure window shades of varying specifications before cutting, and can be used repeatedly to perform cutting operation for a wide variety of window shades.

4. The severed window shade has a neat vertical edge: The cutting edge of the cutter can be guided vertically towards a lower cutting surface of shade guiding assembly, thus the cutter can be moved as desired to form a neat cutting edge on the window shade without skewing.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
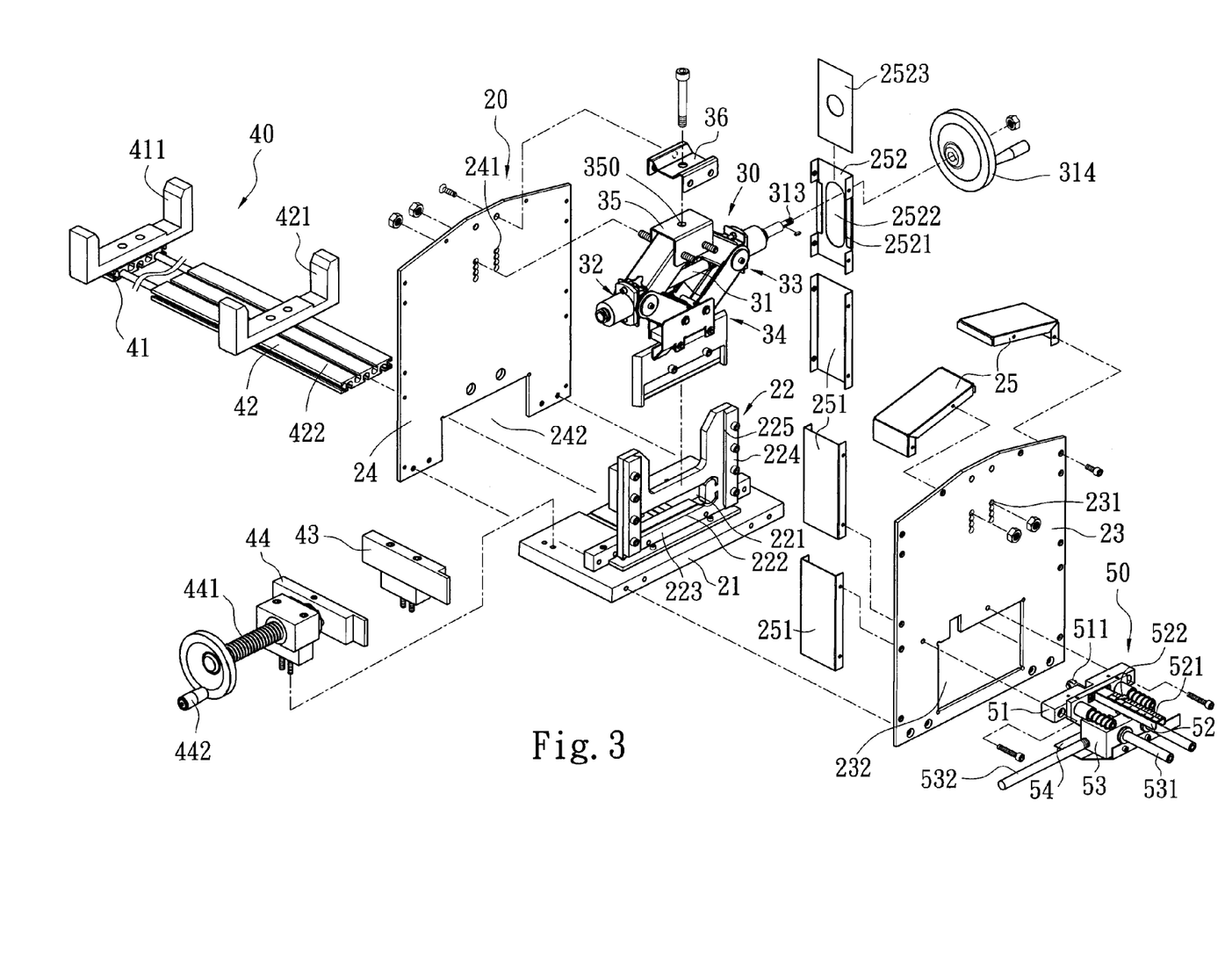
FIG. 3 is an exploded view of the window shade cutting apparatus of the invention.
Figure 4:
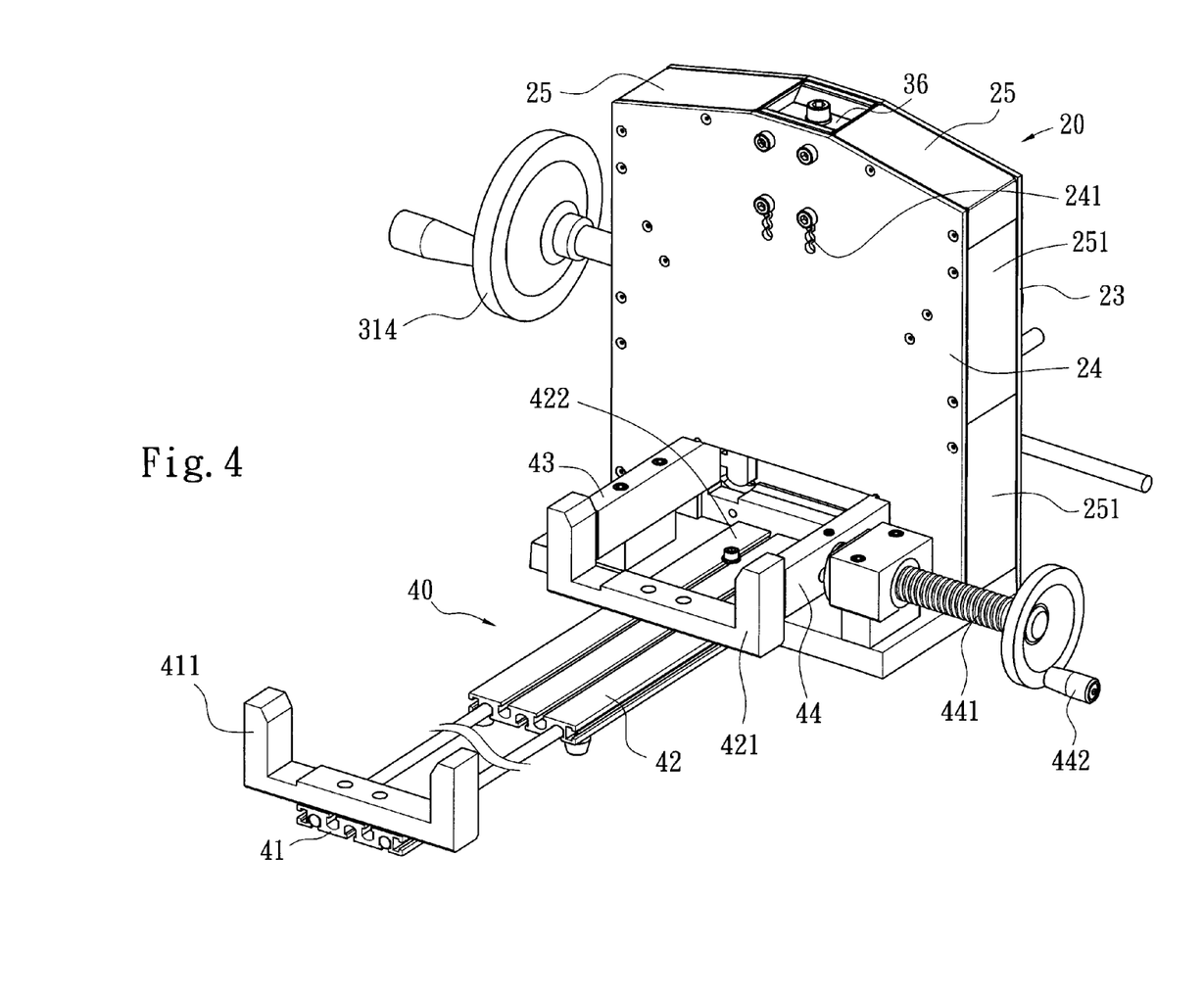
FIG. 4 is a perspective view of the window shade cutting apparatus of the invention.

Please referring to FIGS. 3 and 4, the window shade cutting apparatus according to the invention includes a hollow frame 20 consisting of a base 21, a front wall 23, a rear wall 24, and a first side wall 25, a second side wall 251 and a third side wall 252 to hold a shade guiding assembly 22, a cutter assembly 30 located above the shade guiding assembly 22 and coupled therewith, a clipping assembly 40 located at one side of the base 21 and a shade measuring assembly 50 located at another side of the base with a measurement scale formed thereon.

The frame 20 has at least one side wall for anchoring. The shade guiding assembly 22 is mounted onto the base 21 in an upright manner at one side of the frame 20 and has a cavity 221 at a lower side to receive a window shade. The shade guiding assembly 22 further has a spacer 223 with a lower cutting surface 222 formed thereon. The shade guiding assembly 22 also has two sides with respectively a holding plank 224 fastened thereon and a side guide 225 between the two holding planks 224 to direct a cutter 34 of the cutter assembly 30 to move up and down. The spacer 223 is fastened to the front wall 23 and the rear wall 24 that have respectively a multi-stage fastening hole 231 and 241 formed thereon, and the first, second and third side walls 25, 251 and 252 to become an integrated member. The front and rear walls 23 and 24 also have respectively a notch 232 and 242 at a lower side, and the peripheries thereof fastened to the side walls 25, 251 and 252 to form a space to hold the cutter assembly 30 inside. The third side wall 252 has bend edges 2521 at two sides to couple with a coupling plate 2523 and a slot 2522 run through by a transmission screw bar 31.

Figure 5:
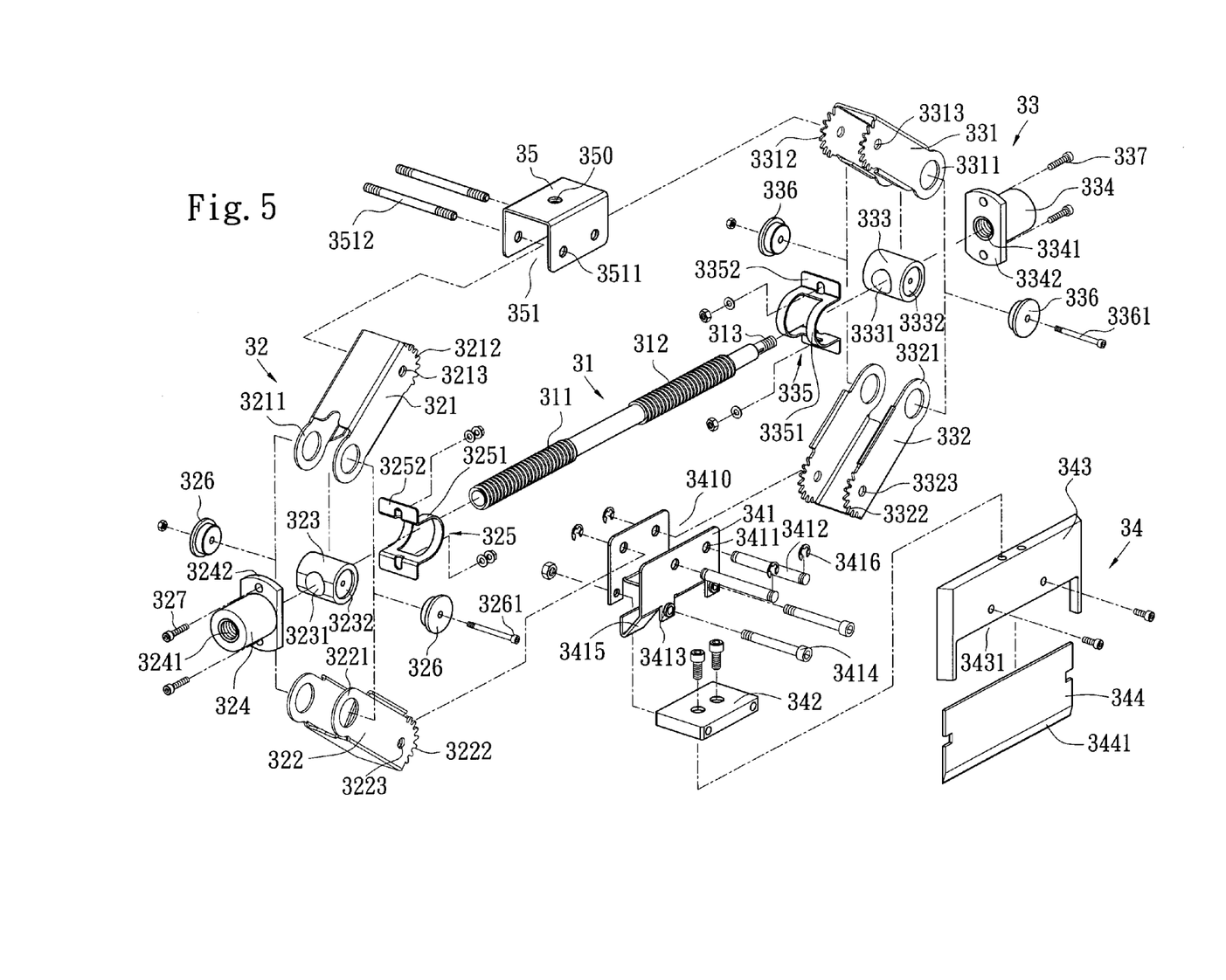
FIG. 5 is an exploded view of the cutter assembly of the invention.
Figure 6:
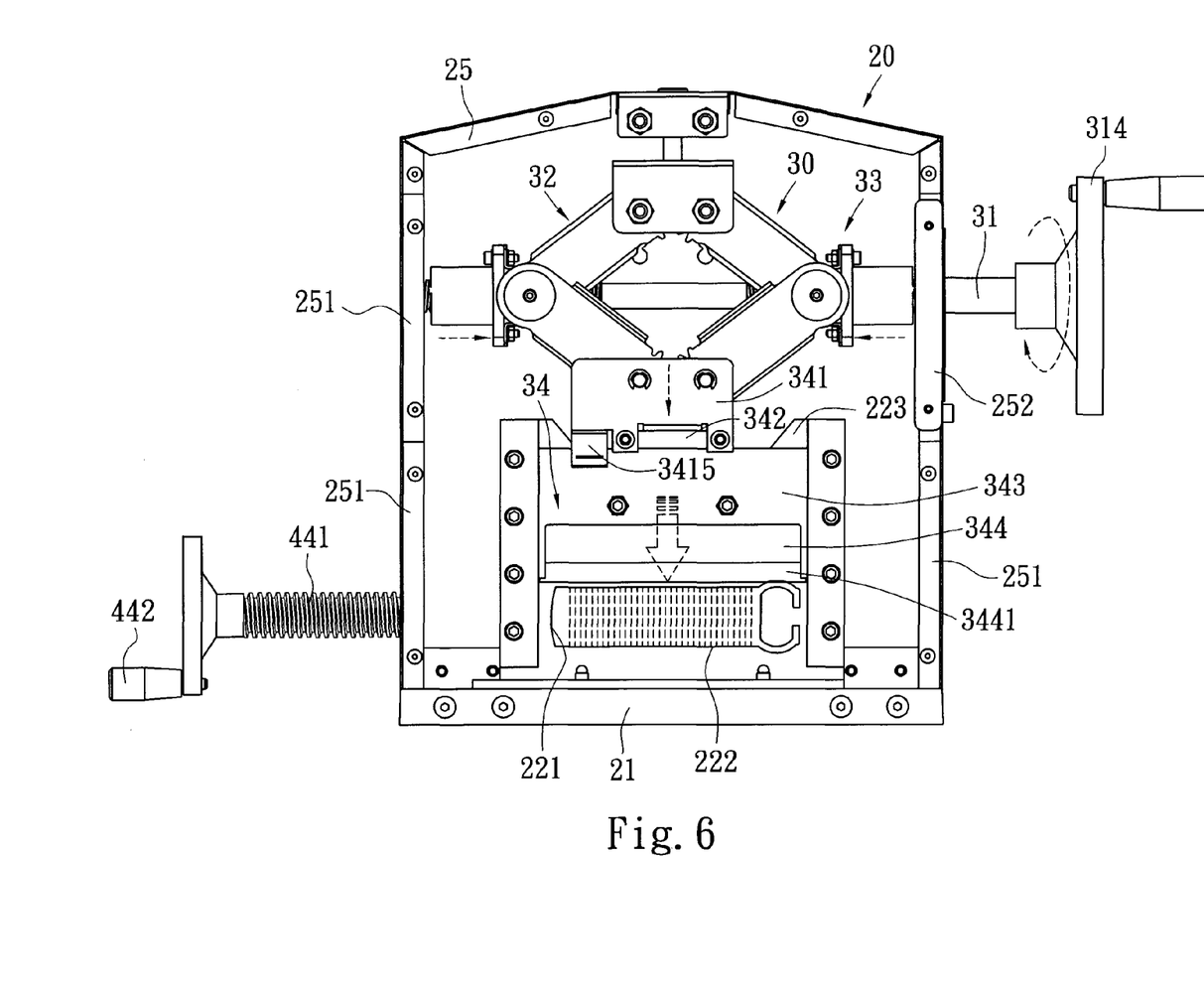
FIG. 6 is a schematic view of the cutter assembly in an operating condition.
Figure 7:
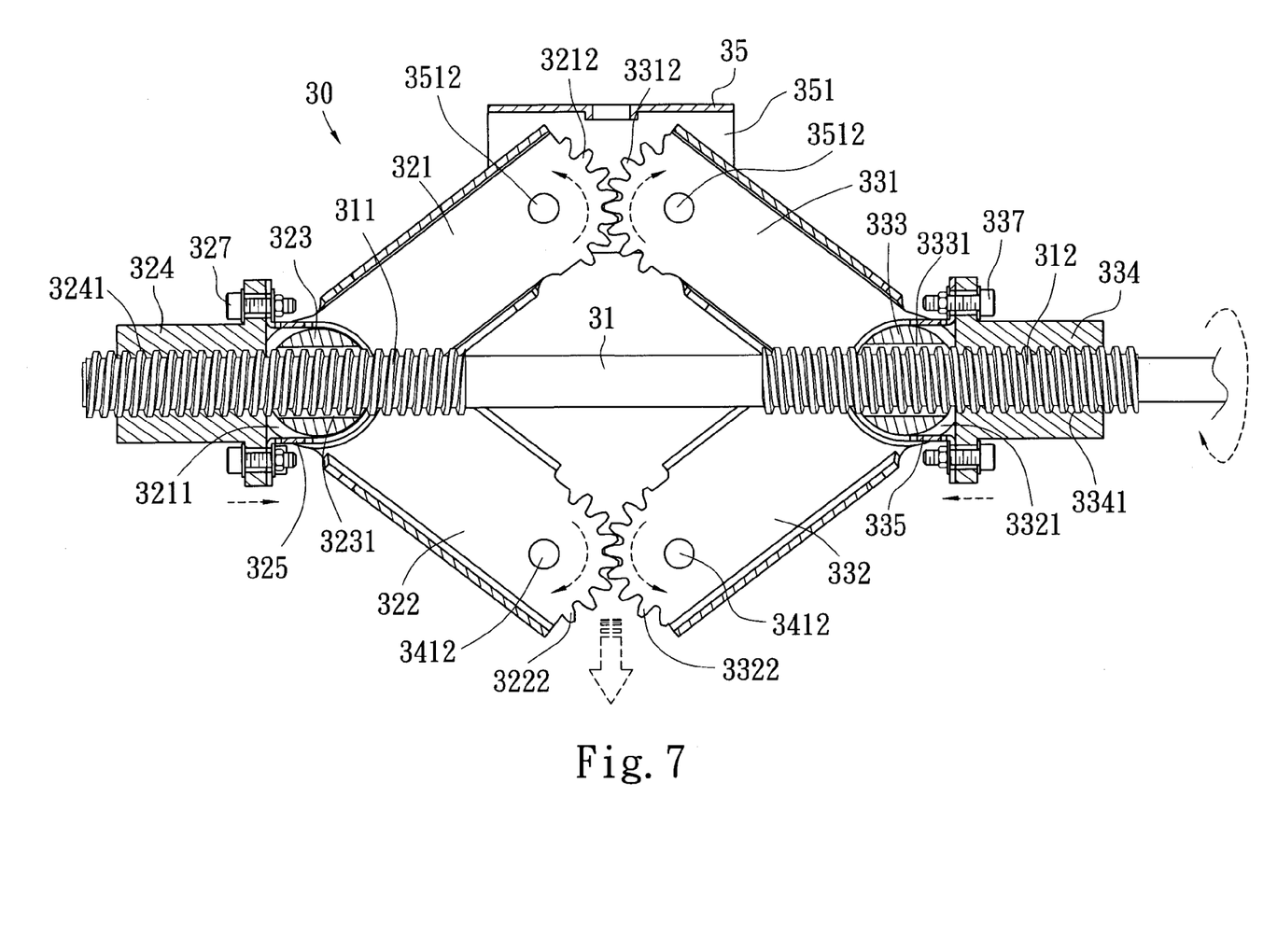
FIG. 7 is a schematic view of the first and second toggle levers of the invention in an engaging and transmission condition.
Figure 10:
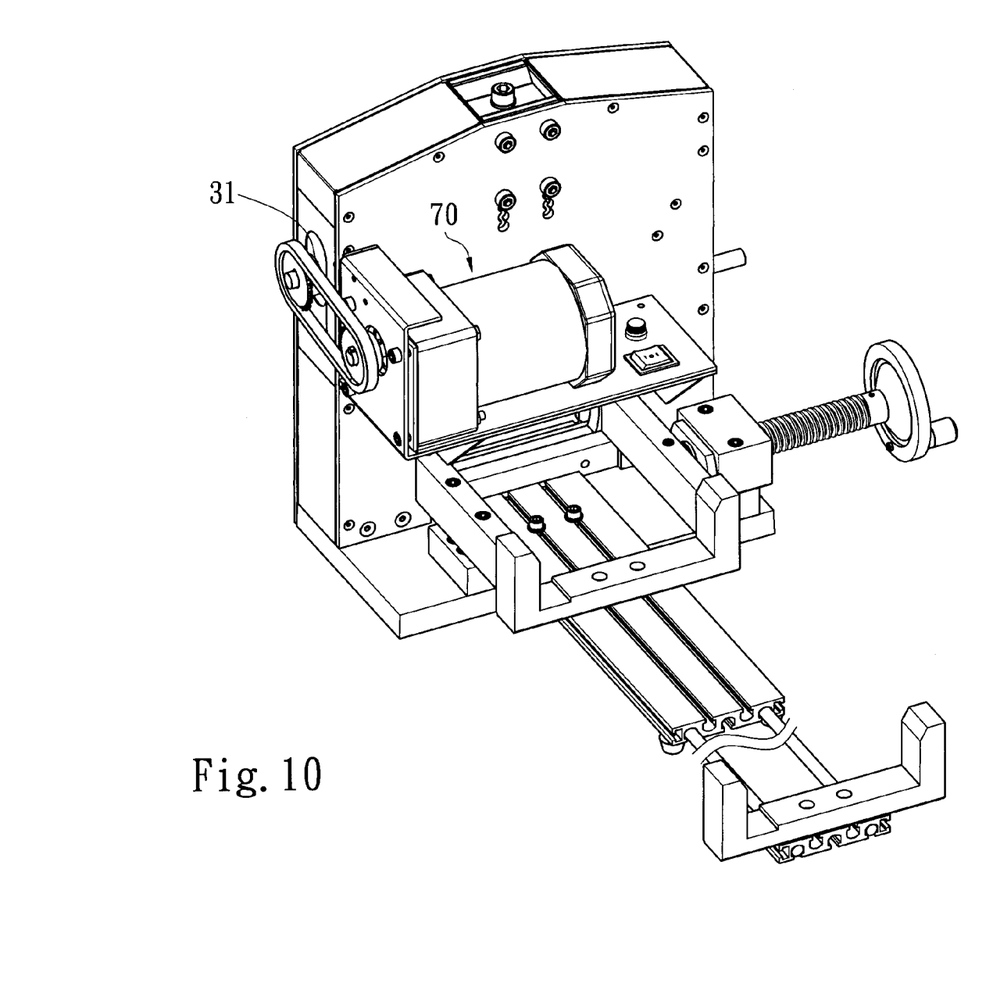
FIG. 10 is a perspective view of the window shade cutting apparatus of the invention coupling with a power driving means.

The cutter assembly 30, also referring to FIGS. 5, 6 and 7, is located above the shade guiding assembly 22 and fastened to the fastening holes 231 and 241 of the front and rear walls 23 and 24. It includes at least the transmission screw bar 31, a first toggle lever set 32 and a second toggle lever set 33 pivotally coupled on two opposite sides of the transmission screw bar 31 that correspond to each other to move the cutter 34 up and down, and a hinged member 35 hinged on first toggle levers 321 and 322, and second toggle levers 331 and 332. The transmission screw bar 31 has a first external thread portion 311 and a second external thread portion 312 formed on the two sides. The second external thread portion 312 has one end extended to form a strut 313 to couple with a first handle 314. The first handle 314 may be grasped by a user's hand to rotate the transmission screw bar 31 and move the first and second toggle lever sets 32 and 33 inwards and outwards; or as shown in FIG. 10, a power driving means 70 such as a motor or the like may be provided to couple with the transmission screw bar 31 so that electric transmission can be accomplished to move the first and second toggle lever sets 32 and 33 inwards and outwards. The first and second toggle lever sets 32 and 33 are moved in opposite directions, and have the first and second toggle levers 321, 322, 331 and 332 joined one another, coupling members 323 and 333, screw nuts 324 and 334, latch clips 325 and 335 and two plugs 326 and 336. The first and second toggle levers 321, 322, 331 and 332 have respectively a hinged end 3211, 3221, 3311 and 3321 to hinge on the coupling members 323 and 333, and an engaging end 3212, 3222, 3312 and 3322 that are engageable with each other to perform transmission. The first and second toggle levers 321, 322, 331 and 332 further have respectively a pin hole 3213, 3223, 3313 and 3323 corresponding to the fastening holes 231 and 241, and a fastening plate 341 of the cutter assembly 34. The coupling members 323 and 333 are hinged respectively on the hinged ends 3211, 3221, 3311 and 3321 so that they are turning about a single axis. The coupling members 323 and 333 have respectively an axial through hole 3231 and 3331 run through by the transmission screw bar 31, and a recess 3232 and 3332 formed at each of two sides to couple with the plug 326 and 336, and fastened by a fastening element 3261 and 3361. The screw nuts 324 and 334 are located at an outer side of the coupling members 323 and 333, and have respectively a screw hole 3241 and 3341 engaging with the first and second external thread portions 311 and 312, and an anchor wall 3242 and 3342 at one side. The latch clips 325 and 335 have respectively an arched portion 3251 and 3351 to encase the coupling members 323 and 333, and a flange 3252 and 3352 corresponding to the anchor walls 3242 and 3342 to engage with screws 327 and 337 to be fastened thereon.

The cutter 34 includes a fastening plate 341, a bridging plate 342, a blade holding dock 343 and a blade 344. The fastening plate 341 has an upper clipping space 3410 and a second pin hole 3411 formed close to the top thereof. The engaging ends 3222 and 3322 of the first and second toggle levers 322 and 332 can be held in the clipping space 3410 with the pin holes 3223 and 3323 mating the second pin hole 3410 to receive a pin 3412 latched by a clipping washer 3416 for positioning. The cutter 34 further has a fastening end 3413 at a lower side and a diagonal elastic reed 3415 extended from one side of a lower edge thereof. The bridging plate 342 is fastened to the fastening end 3413 through a fastening element 3414. The cutter holding dock 343 is fastened to the lower side of the bridging plate 342 and has a blade notch 3431 formed at the bottom thereof. The blade 344 is held in the blade notch 3431 and has a cutting edge 3441 at the bottom. The hinged member 35 has a fastening hole 350 formed at the upper side to fasten to a coupling element 36 and a holding space 351 at a lower side to engage with the engaging ends 3212 and 3312 of the first and second toggle levers 321 and 331. The hinged member 35 further has hole 3511 on two sides corresponding to the pins holes 3213 and 3313 to be hinged by bolts 3512.

The clipping assembly 40, referring to FIGS. 3 and 4, is located at one side of the base 21, and includes a first track 41 and a second track 42 to be wedged in respectively by a bracing dock 411 and 421 to hold a window shade 60, and a first clipping member 43 and a second clipping member 44 that correspond to each other. The second clipping member 44 is fastened to a screw bar 441 screwed with a second handle 442 to be fine tuned therewith. The second track 42 has one end 422 fastened to one side of the base 21. The base 21 has two ends fastened to the first and second clipping member 43 and 44 in the notch 242 at the lower side of the rear wall 24.

Figure 8:
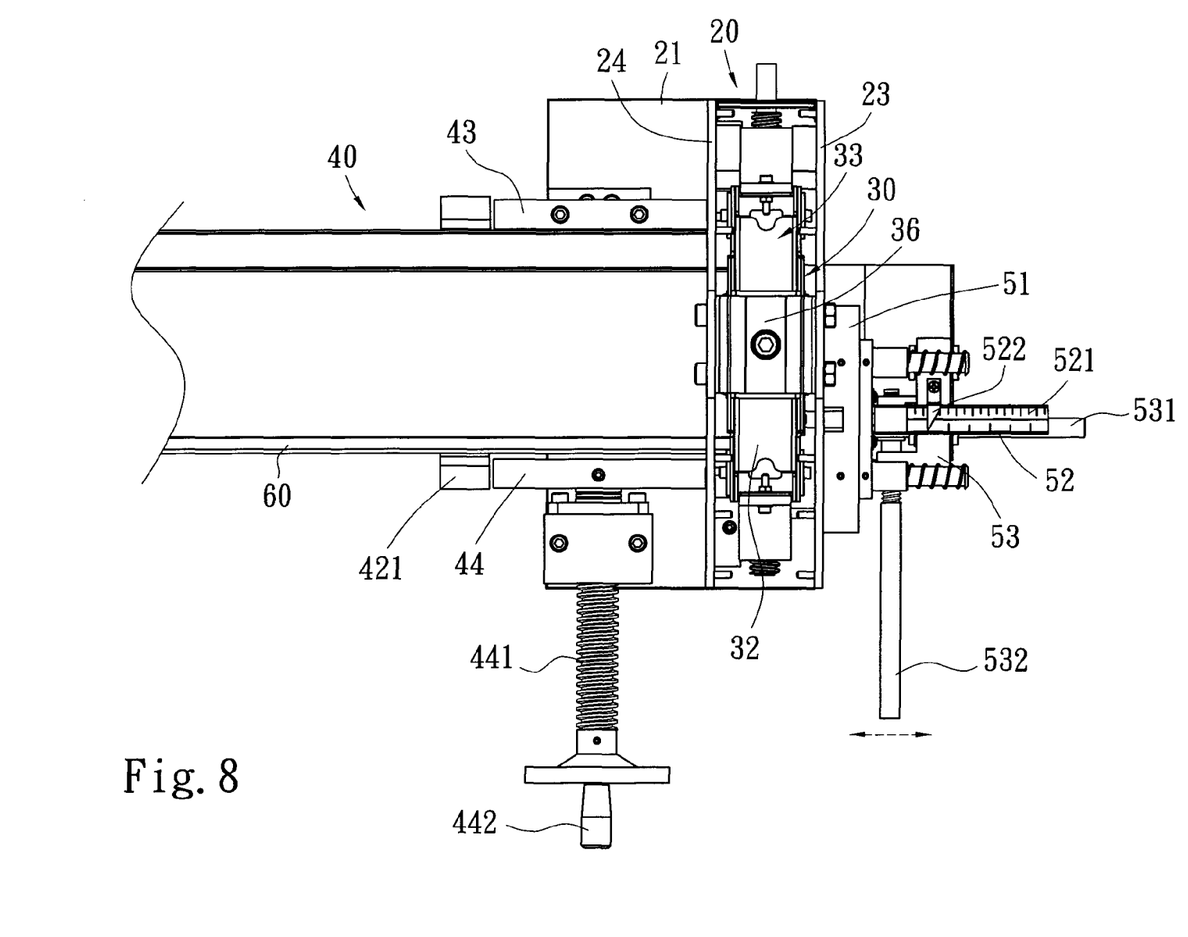
FIG. 8 is a top view of the ancillary moving assembly of the invention in a use condition.
Figure 9:
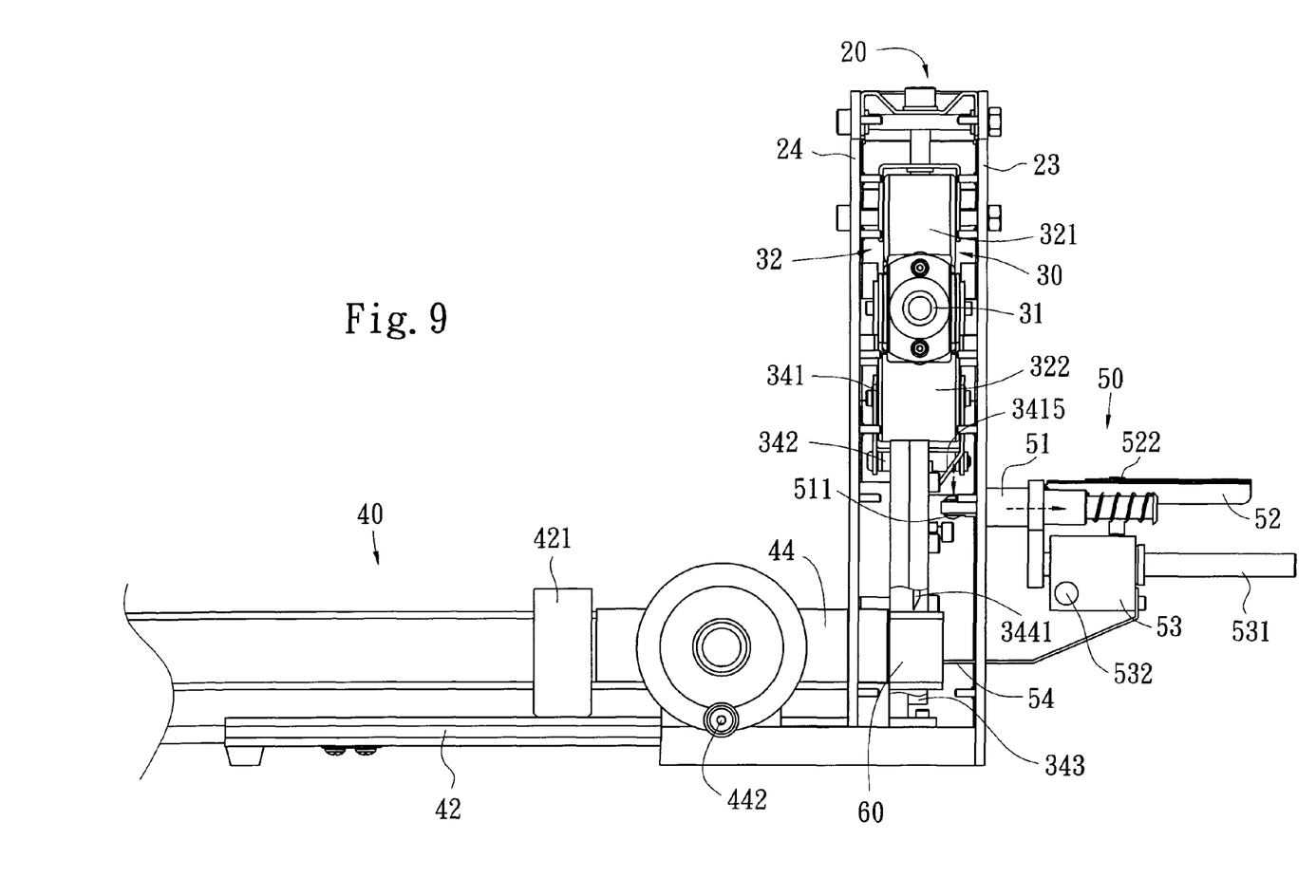
FIG. 9 is a side view of the ancillary moving assembly of the invention in a use condition.

The shade measuring assembly 50, referring to FIGS. 3, 8 and 9, is located at another side of the base 21, and includes an anchor member 51 fastened to the front wall 23, a holding member 52 coupling with the anchor member 51 that has a dimension scale 521 and a pointer 522, and a movable member 53 pivotally coupled with the anchor member 51. There is also a follower rod 511 located in the center of the anchor member 51 to press the diagonal elastic reed 3415 at the lower side of the fastening plate 341 and movable rear wards. The movable member 53 has two sides with two corresponding guiding rods 531 located thereon and a handle bar 532 screwing at one side vertically. The movable member 53 can be moved to the right and left through the handle bar 532. There is further a anchor member 51 fastened to a lower end of the movable member 53 to press one side of the window shade 60 held in the cavity 221 for positioning.

Figure 11:
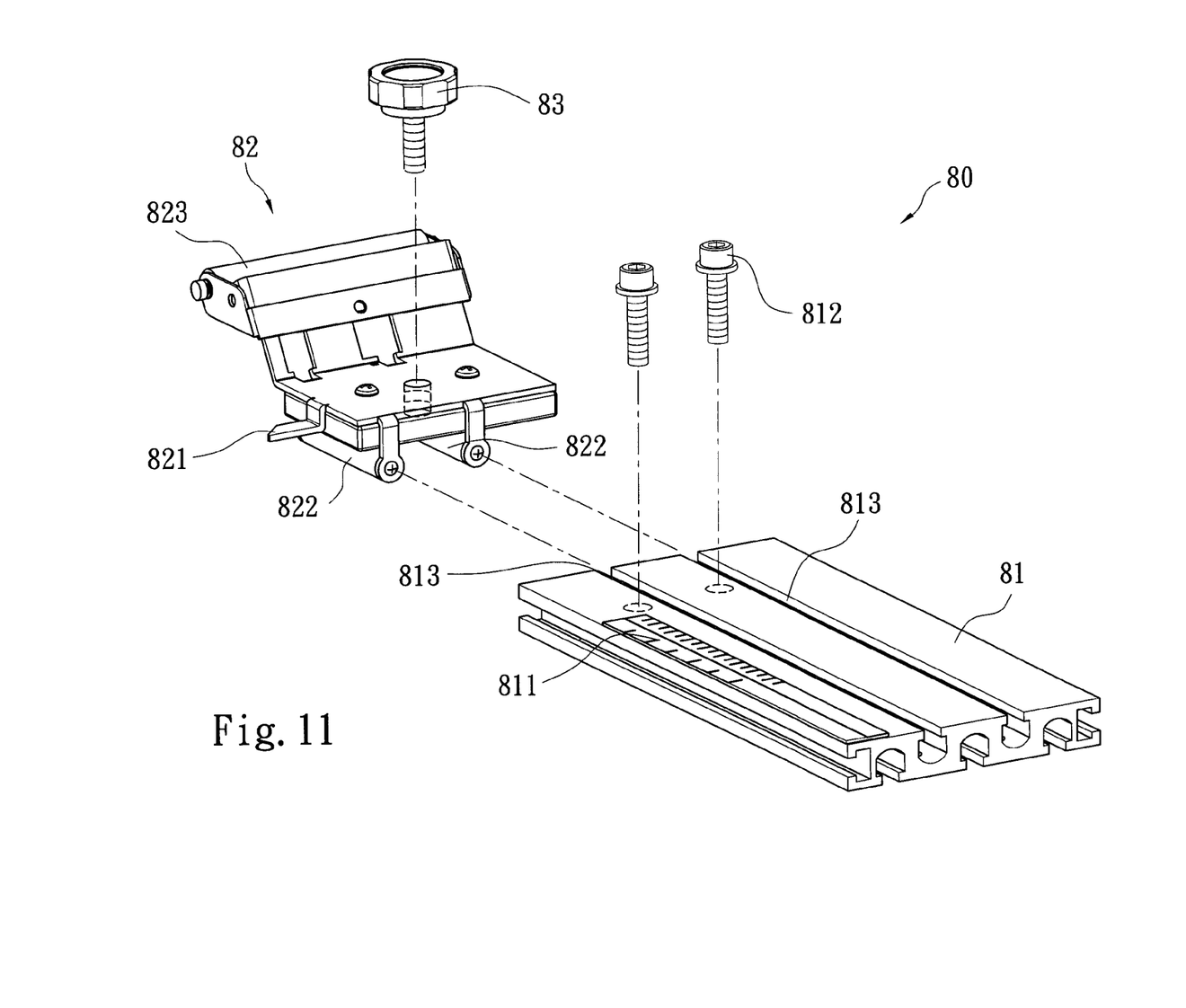
FIG. 11 is an exploded view of another embodiment of the shade measuring assembly of the invention.
Figure 12:
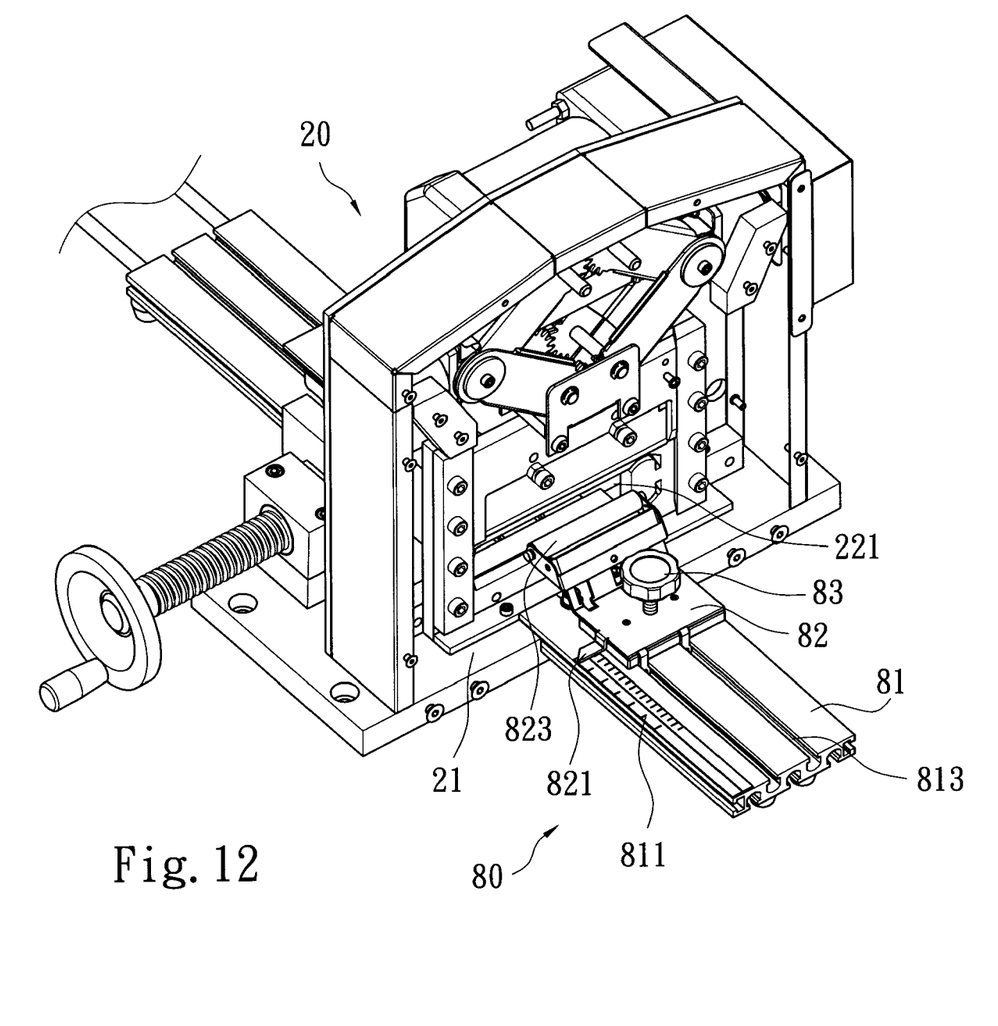
FIG. 12 is a perspective view of the shade measuring assembly according to FIG. 11.
Figure 13:
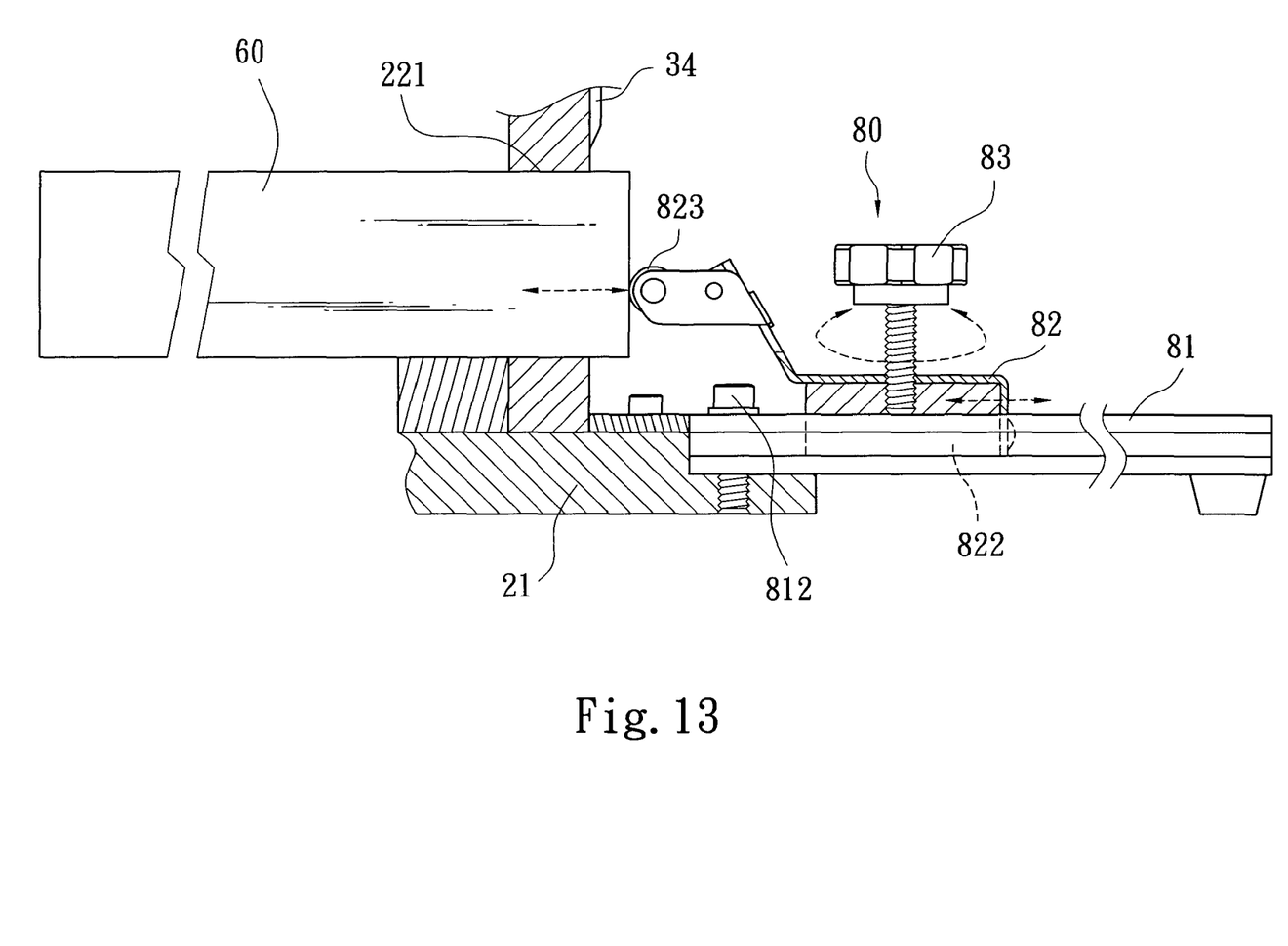
FIG. 13 is a schematic view of the shade measuring assembly according to FIG. 11 in an operating condition.

Refer to FIGS. 11 and 12 for another embodiment of the window shade cutting apparatus of the invention. It is constructed substantially same as the one shown in FIG. 3. It differs in the shade measuring assembly 80 which has at least a track 81 and a slider 82 with a rotatable stopper 823 and a pointer 821 located thereon. The track 81 has a dimension scale 811 at one side, and can be fastened to the base 21 through fastening elements 812. It also has guiding flutes 813 to hold slider 822 located at one end of the slider 82 so that the slider 82 can slide forwards and rearwards thereon. The slider 82 is coupled with a screw 83 at one end to be screwed in the directing flute 813 for anchoring. The stopper 823 is rotatable on another end to press one side of the window shade 60 held in the cavity 221 for positioning. Thereby the cutter 34 can be moved easily downwards to cut off the window shade 60 held in the cavity 221 (referring to FIG. 13).

When the invention is in use to cut off the window shade 60, such as a blind, pleated shade or the like, referring to FIGS. 4, 6 and 8, the window shade 60 is wound first; next, the window shade 60 is held in the bracing docks 411 and 421 of the clipping assembly 40 and positioned in the cavity 221; the length of the window shade 60 to be cut off can be measured by moving the pointer 522 against the dimension scale 521; then, referring to FIGS. 6 and 9, turn the transmission screw bar 31 of the cutter assembly 30 to drive the first and second toggle lever sets 32 and 33 to move the cutting edge 3441 downwards to the lower cutting surface 222 to sever the window shade 60. Moving down of the cutter 34 can be directed securely to cut off the window shade 60 held in the cavity 221 with less effort. The severed window shade 60 has a neat cutoff side without skewing. Thus overall aesthetic appeal of the window shade 60 can be maintained intact. The width of the cutoff window shade also can match the width of the window or door to be installed.

As a conclusion, the window shade cutting apparatus of the invention has the clipping assembly 40 and shade measuring assembly 50 at two sides of the base 21 of the frame 20 to confine the wound window shade 60 in the shade guiding assembly 22. The transmission screw bar 31 in the cutter assembly 30 can drive the first and second toggle lever sets 32 and 33 to securely move the cutter 34 up and down with the aid of the shade guiding assembly 22 to sever the window shade 60 easily and neatly.

What is claimed is:

1. A window shade cutting apparatus, comprising at least:
   a frame having at least one side wall for anchoring, a base and a shade guiding assembly mounted onto the base, the shade guiding assembly having a cavity to receive a window shade;
   a cutter assembly which is located above the shade guiding assembly and has one end fastened to the side wall and includes at least a transmission screw bar, a first toggle lever set and a second toggle lever set hinged on two sides of the transmission screw bar corresponding to each other to move a cutter up and down;
   a clipping assembly including at least a first track and a second track that are wedged respectively by a bracing dock, and a first clipping member and a second clipping member located at two ends of the base, the second clipping member being coupled with a screw bar for fine tuning thereof; and
   a shade measuring assembly which is located at another side of the base and includes an anchor member, a holding member fastened to the anchor member and a movable member pivotally coupled with the anchor member.

2. The window shade cutting apparatus of claim 1, wherein the transmission screw bar has a first external thread portion and a second external thread portion at two sides thereof, the second external thread portion having one end extended to form a strut.

3. The window shade cutting apparatus of claim 2, wherein the strut is coupled with a first handle to perform transmission.

4. The window shade cutting apparatus of claim 2, wherein the strut is pivotally coupled with a power driving means to perform transmission.

5. The window shade cutting apparatus of claim 1, wherein the first toggle lever set and the second toggle lever set are opposing to each other, and include at least a first toggle lever, a second toggle lever, a coupling member, a screw nut, a latch clip and two plugs.

6. The window shade cutting apparatus of claim 5, wherein the first toggle lever and the second toggle lever have respectively a hinged end hinged on the coupling member and an engaging end engageable with each other to perform transmission, and a pin hole corresponding to a fastening hole and the cutter assembly.

7. The window shade cutting apparatus of claim 6, wherein the coupling member is coupled with the hinged end to form turning about an axis and has an axle through hole and a recess on each of two sides thereof to be coupled with a plug.

8. The window shade cutting apparatus of claim 5, wherein the screw nut is located at an outer side of the coupling member and has a screw hole formed therein and an anchor wall at one side.

9. The window shade cutting apparatus of claim 5, wherein the latch clip has an arched portion and two flanges at two sides.

10. The window shade cutting apparatus of claim 1, wherein the cutter is located at a lower side of the first toggle lever set and the second toggle lever set and directed vertically downwards, and includes at least a fastening plate, a bridging plate fastened to a lower side of the fastening plate, a blade holding dock fastened to a lower side of the bridging plate and a blade located on the blade holding dock that has a cutting edge at the bottom thereof.

11. The window shade cutting apparatus of claim 10, wherein the fastening plate has an upper clipping space at an upper side and a fastening end at a lower side, the fastening end having a diagonal elastic reed extended from one side and a lower edge thereof.

12. The window shade cutting apparatus of claim 1, wherein the shade guiding assembly has a spacer at a lower side that has a lower cutting surface formed thereon and two sides fastened respectively to a holding plank to form a side guide therebetween.

13. A window shade cutting apparatus, comprising at least:
   a frame having at least one side wall for anchoring, a base and a shade guiding assembly mounted onto the base, the shade guiding assembly having a cavity to receive a window shade;
   a cutter assembly which is located above the shade guiding assembly and has one end fastened to the side wall and includes at least a transmission screw bar, a first toggle lever set and a second toggle lever set hinged on two sides of the transmission screw bar corresponding to each other to move a cutter up and down;
   a clipping assembly including at least a first track and a second track that are wedged respectively by a bracing dock and a first clipping member and a second clipping member located at two ends of the base, the second clipping member being coupled with a screw bar for fine tuning thereof; and
   a shade measuring assembly which includes at least a track, a slider and a stopper located on the slider and rotatable thereon.

14. The window shade cutting apparatus of claim 13, wherein the transmission screw bar has a first external thread portion and a second external thread portion at two sides, the second external thread portion having one end extended to form a strut.

15. The window shade cutting apparatus of claim 14, wherein the strut is coupled with a first handle to perform transmission.

16. The window shade cutting apparatus of claim 14, wherein the strut is coupled with a power driving means to perform transmission.

17. The window shade cutting apparatus of claim 13, wherein the first toggle lever set and the second toggle lever set are opposing each other, and include at least a first toggle lever, a second toggle lever, a coupling member, a screw nut, a latch clip and two plugs.

18. The window shade cutting apparatus of claim 17, wherein the first toggle lever and the second toggle lever have respectively a hinged end hinged on the coupling member and an engaging end engageable with each other to perform transmission, and a pin hole corresponding to a fastening hole (231, 241) and the cutter assembly.

19. The window shade cutting apparatus of claim 18, wherein the coupling member is coupled with the hinged end to form turning about an axis and has an axle through hole and a recess on each of two sides thereof to be coupled with a plug.

20. The window shade cutting apparatus of claim 17, wherein the screw nut is located at an outer side of the coupling member and has a screw hole formed thereon and an anchor wall at one side.

21. The window shade cutting apparatus of claim 17, wherein the latch clip has an arched portion and two flanges at two sides.

22. The window shade cutting apparatus of claim 13, wherein the cutter is located at a lower side of the first toggle lever set and the second toggle lever set and directed vertically downwards, and includes at least a fastening plate, a bridging plate fastened to a lower side of the fastening plate, a blade holding dock fastened to a lower side of the bridging plate and a blade located on the blade holding dock that has a cutting edge at the bottom thereof.

23. The window shade cutting apparatus of claim 22, wherein the fastening plate has an upper clipping space at an upper side and a fastening end at a lower side thereof.

24. The window shade cutting apparatus of claim 13, wherein the shade guiding assembly has a spacer at a lower side that has a lower cutting surface formed thereon, and two sides fastened respectively to a holding plank to form a side guide therebetween.

* * * * *